(12) United States Patent
Li et al.

(10) Patent No.: US 10,565,911 B2
(45) Date of Patent: Feb. 18, 2020

(54) DEVICE AND METHOD FOR DETECTION OF DISPLAY PANEL

(71) Applicants: BOE Technology Group Co., Ltd., Beijing (CN); Beijing BOE Display Technology Co., Ltd., Beijing (CN)

(72) Inventors: Wei Li, Beijing (CN); Minghui Ma, Beijing (CN); Jinhu Cao, Beijing (CN); Bin Cao, Beijing (CN); Kwon Namin, Beijing (CN); Jiaxin Yu, Beijing (CN); Fengwu Yu, Beijing (CN); Mian Gao, Beijing (CN)

(73) Assignees: BOE TECHNOLOGY GROUP CO., LTD., Beijing (CN); BEIJING BOE DISPLAY TECHNOLOGY CO., LTD, Beijing (CN)

( * ) Notice: Subject to any disclaimer, the term of this patent is extended or adjusted under 35 U.S.C. 154(b) by 161 days.

(21) Appl. No.: 15/676,634

(22) Filed: Aug. 14, 2017

(65) Prior Publication Data

US 2018/0197445 A1 Jul. 12, 2018

(30) Foreign Application Priority Data

Jan. 12, 2017 (CN) .......................... 2017 1 0022865

(51) Int. Cl.
*G01R 31/28* (2006.01)
*G09G 3/00* (2006.01)
(Continued)

(52) U.S. Cl.
CPC ........... *G09G 3/006* (2013.01); *G06T 7/0004* (2013.01); *G06T 7/90* (2017.01); *G06T 2207/30121* (2013.01)

(58) Field of Classification Search
CPC ....... G06T 7/0004; G06T 7/0008; G06T 7/90; G06T 2207/10024; G06T 2207/10152;
(Continued)

(56) References Cited

U.S. PATENT DOCUMENTS 5,377,030 A * 12/1994 Suzuki .................. G02F 1/1309
324/71.3
9,483,969 B2 11/2016 Wang
(Continued)

FOREIGN PATENT DOCUMENTS

CN 102681279 A 9/2012
CN 103077674 A 5/2013
(Continued)

OTHER PUBLICATIONS

First Office Action, including Search Report, for Chinese Patent Application No. 201710022865.1, dated Sep. 4, 2019, 14 pages.

*Primary Examiner* — Melissa J Koval
*Assistant Examiner* — Courtney G McDonnough
(74) *Attorney, Agent, or Firm* — Westman, Champlin & Koehler, P.A.

(57) ABSTRACT

A device for detection of a display panel is provided in the embodiments of the disclosure, which is configured to detect signal lines on the display panel. The signal lines at least comprises a plurality of data lines which are divided into N groups; the device comprises: N shorting bars provided within an electrode lead region of the display panel to intersect the plurality of data lines, a plurality of welding pads provided on both sides of the electrode lead region, each of which shorting bars short-circuits one of the N groups of data lines together and connects with two welding pad at both ends thereof respectively, and a switch which is provided between each of the shorting bars and each of the corresponding welding pads connecting with the former on
(Continued)

one and the same side of all the shorting bars; and N is a positive integer not less than.

13 Claims, 4 Drawing Sheets

(51) Int. Cl.
  *G06T 7/00* (2017.01)
  *G06T 7/90* (2017.01)
(58) Field of Classification Search
  CPC .......... G06T 2207/30121; G09G 3/006; G09G 2300/0404; G09G 2310/0232
  USPC ........................................................ 324/512
  See application file for complete search history.

(56) References Cited

U.S. PATENT DOCUMENTS 9,921,446 B2   3/2018   Yu et al.

| | | | |
|---|---|---|---|
| 2002/0145440 A1* | 10/2002 | Ohya | G01R 31/2884 324/750.3 |
| 2007/0046316 A1* | 3/2007 | Uei | G09G 3/006 324/760.01 |
| 2014/0375344 A1 | 12/2014 | Wang | |
| 2015/0015823 A1* | 1/2015 | Lo | G09G 3/006 349/43 |
| 2015/0022211 A1* | 1/2015 | Du | G09G 3/006 324/414 |
| 2016/0064364 A1* | 3/2016 | Shin | G02F 1/1309 257/88 |
| 2017/0192326 A1 | 7/2017 | Yu et al. | |

FOREIGN PATENT DOCUMENTS

| | | |
|---|---|---|
| CN | 103325327 A | 9/2013 |
| CN | 103345079 A | 10/2013 |
| CN | 105609025 A | 5/2016 |
| KR | 2000-0065730 A | 11/2000 |

* cited by examiner

DEVICE AND METHOD FOR DETECTION OF DISPLAY PANEL

CROSS-REFERENCE TO RELATED INVENTION

The present disclosure claims the benefit of Chinese Patent Application Invention No. 201710022865.1 filed on Jan. 12, 2017 in the State Intellectual Property Office of China, the whole disclosure of which is incorporated herein by reference.

BACKGROUND OF THE INVENTION

Field of the Invention

Embodiments of the present disclosure relate to, but not limited, the technical field of display technology, and in particular, to a device and method for detection of a display panel.

Description of the Related Art

Liquid crystal display, which may be abbreviated as LCD, is a type of display apparatus which is planar and super slim, comprising a certain amount of color pixels or black-and-white pixels provided in front of a light source or a reflecting surface. LCD has become popular and been predominant in displays, due to some superior properties thereof, such as relatively low power consumption, relatively high image quality, relatively small volume and relatively light weight. Nowadays, LCDs are typically and mainly Thin Film Transistor (TFT) displays.

Preparation processes of a display panel comprises an Array substrate process, a Color-Film (CF) substrate process, and a Cell process between the array substrate and the color film substrate during which a Cell Test is carried out for testing functionalities of the display panel. Depending on defects which are produced to the panel products during above three processes (i.e., Array, CF and Cell) and then detected by the Cell Test, then, panel products having defects are removed.

In a field of detection on traditional TFT LCD, an object to be detected by the Cell Test comprises a visual defect which appears once the panel is energized and an apparent defect which is apparent to human eyes, and the Cell Test may be divided depending on difference in energization ways as Full Contact detection and Shorting Bar detection. As to tiny conchoidal fracture (referring to a surface breakage/crack which is not penetrating and is shell-shaped) or crack at an edge electrode region of a flat-panel display, once above ways are adopted, there may be no abnormal phenomenon which may be observed by visual check, or there may be some abnormal phenomena which may be indistinguishable as compared with other defects and thus may not be detected.

SUMMARY OF THE INVENTION

The embodiments of the present disclosure have been made to overcome or alleviate at least one aspect of the above mentioned disadvantages and/or shortcomings in the prior art, by providing a device and method for detection of a display panel, so as to detect fracture or breakage in an electrode lead region of the display panel accurately. The embodiments of the present disclosure provide a device and method for detection of a display panel.

Following technical solutions are adopted in exemplary embodiments of the invention for achieving the above desired technical purposes.

According to an aspect of the exemplary embodiment of the present disclosure, there is provided a device for detection of a display panel, which is configured to detect signal lines on the display panel. The signal lines at least comprises a plurality of data lines which are divided into N groups; the device comprises: N shorting bars provided within an electrode lead region of the display panel to intersect the plurality of data lines, a plurality of welding pads provided on both sides of the electrode lead region each of which shorting bars short-circuits one of the N groups of data lines together and connects with two welding pad at both ends thereof respectively, and a switch which is provided between each of the shorting bars and each of the corresponding welding pads connecting with the former on one and the same side of all the shorting bars; and N is a positive integer not less than 2.

According to an embodiment of the disclosure, N is equal to 2.

According to an embodiment of the disclosure, data lines which are located at odd-number positions connect with one and the same shorting bar, and data lines which are located at even-number positions also connect with another one shorting bar.

According to an embodiment of the disclosure, a distance between two adjacent welding pads is larger than that between two adjacent data lines.

According to an embodiment of the disclosure, the device further comprises redundant welding pads which are dimensioned to be similar to the welding pads, and the welding pads are provided symmetrically and the redundant welding pads are also provided symmetrically, on both sides of the electrode lead region.

According to an embodiment of the disclosure, the switch is a field-effect transistor.

According to another aspect of the exemplary embodiment of the present disclosure, there is provided a method for detection of a display panel, which is applied to the device according to claim 1, comprising the following steps: opening the switch; introducing a detection signal from welding pads on a side away from the switch; and detecting the display panel depending on images displayed by the display panel in a light-on condition thereof.

According to an embodiment of the disclosure, the step of detecting the display panel depending on images displayed by the display panel in a light-on condition thereof comprising: detecting positions where the display panel is broken depending on a dividing line where colors of the images in the light-on condition change.

According to an embodiment of the disclosure, the step of detecting the display panel depending on images displayed by the display panel in a light-on condition thereof comprising: detecting a number of the shorting bars which are broken depending on levels of color changes.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION OF EMBODIMENTS OF THE INVENTION

Figure 1:
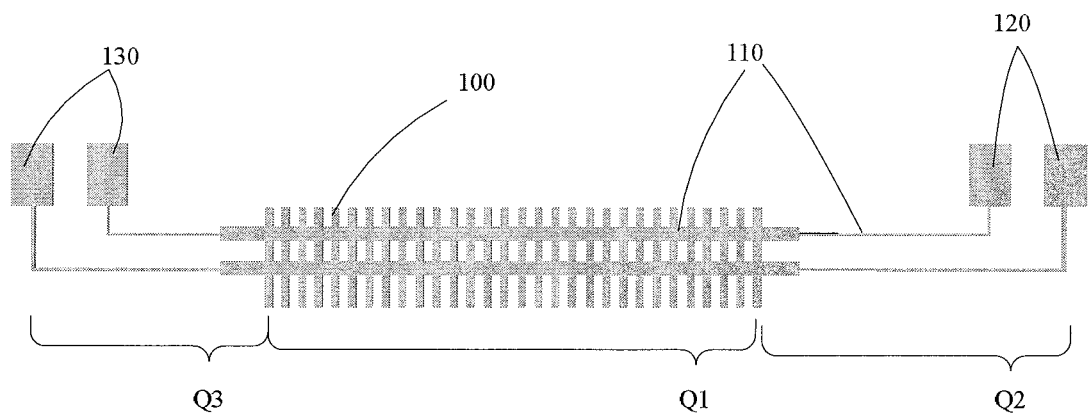
FIG. 1 illustrates a schematic view of a detection structure for detection of a display panel in an exemplary technology.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of the device for detection of a display panel.

FIG. 1 illustrates a schematic view of a detection structure for detection of a display panel in an exemplary technology, which is configured to detect whether there is a defect existing in signal lines on the display panel. As illustrated in FIG. 1, there are a plurality of data lines 100 provided on an electrode lead region Q1 of the display panel, and N shorting bars 110 which are provided on the data lines 100 by intersecting thereto, and N is a integer lager than or equal to 2, such that the data lines 100 are divided into N groups. Each shorting bar is used to short-circuit one of the N groups of data lines 100 together such that the N shorting bars are connected with the N groups of data lines in a one-to-one correspondence, the shorting bar 110 extending to a first detection region Q2 and a second detection region Q3 on both sides of the electrode lead region Q1 respectively, and each of the shorting bars 110 connecting with corresponding one of a first welding pad 120 and a second welding pad 130 respectively at both ends thereof.

The shorting bars are designed to be located within a trimming region; in other words, once the Cell Test is carried out on the panel, lead wires of the welding pads and the shorting bars are at edges thereof by laser after a Mark-Align process, so as to avoid any influence of a risk of short-circuit or erosion caused by exposure of the shorting bars and the welding pads on subsequent processes.

Figure 2:
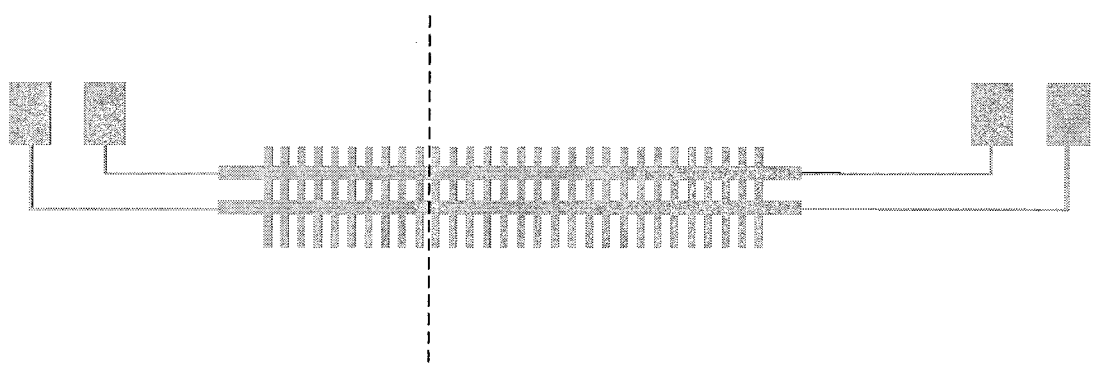
FIG. 2 illustrates a schematic view of the detection structure for detection of the display panel in a condition that a breakage or a conchoidal fracture only hurts/damages shorting bars, without hurting/damaging data lines in an electrode lead region of the display panel.

FIG. 2 illustrates a schematic view of the detection structure for detection of the display panel in a condition that a breakage or a conchoidal fracture only hurts/damages shorting bars, without hurting/damaging data lines in an electrode lead region of the display panel. As to the breakage or the conchoidal fracture which only hurts the shorting bars without hurting data lines of the electrode lead region, as illustrated by a broken line in FIG. 2, since a detection signal of the structure for detection of the display panel as illustrated in FIG. 1 is inputted from the welding pads in the first detection region Q2 and the second detection region Q3, on both sides thereof, then, the displayed images of the display panel in a light-on condition are not influenced, failing to detect the breakage or the conchoidal fracture which only hurts the shorting bars without hurting data lines of the electrode lead region.

Figure 3:
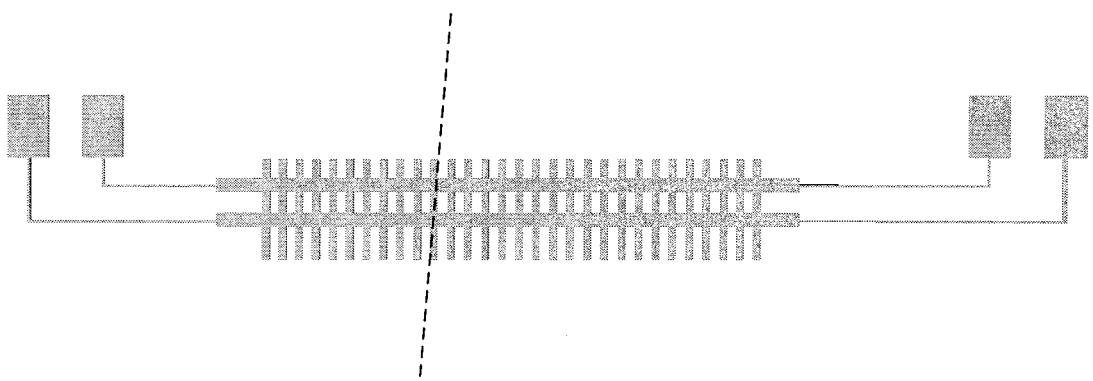
FIG. 3 illustrates a schematic view of the detection structure for detection of the display panel in a condition that a breakage or a conchoidal fracture hurts/damages both shorting bars and data lines in an electrode lead region of the display panel.

FIG. 3 illustrates a schematic view of the detection structure for detection of the display panel in a condition that a breakage or a conchoidal fracture hurts/damages both shorting bars and data lines in an electrode lead region of the display panel. As to the breakage or the conchoidal fracture which hurts/damages both shorting bars and data lines in an electrode lead region of the display panel, as illustrated by a broken line in FIG. 3, the signal input is cut off at a position of the hurt/damaged data lines in the electrode lead region. such that the displayed images of the display panel in a light-on condition present defects of a single wire or a plurality of wires (i.e., vertical wire or wires, also referred to as X-line(s)) appearing at the position where the single input is cut off. Since at that time a phenomenon of the defects may not be distinguished from X-lines caused by other reasons, resulting in an erroneous judgment which has a great impact on subsequent processes, and subsequent services and maintenances.

In order to detect the breakage or the conchoidal fracture in the electrode lead region, a device for detection of a display panel is designed as follows.

First Embodiment

Figure 4:
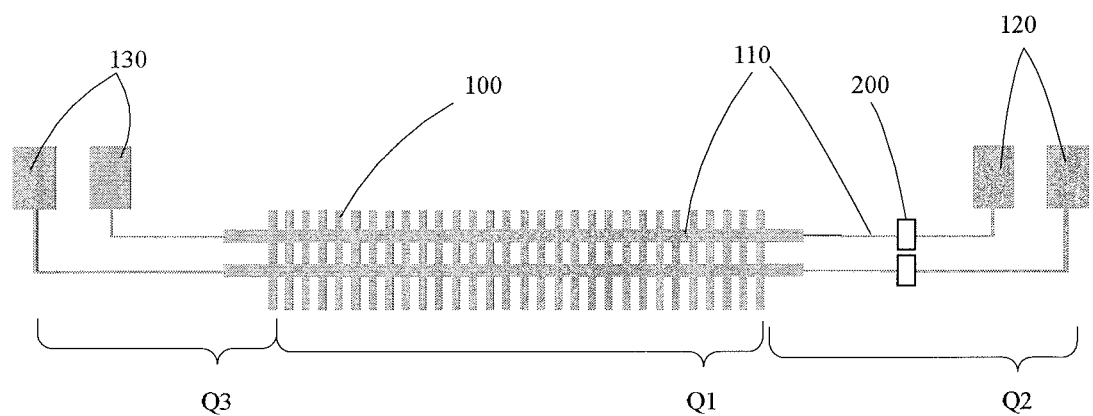
FIG. 4 illustrates a schematic view of a device for detection of a display panel according to an exemplary embodiment of the disclosure.

FIG. 4 illustrates a schematic view of a device for detection of a display panel according to a first exemplary embodiment of the disclosure. As illustrated in FIG. 4, the device for detection of the display panel according to an embodiment of the disclosure is provided. A plurality of data lines 100 are provided in the electrode lead region Q1, and two shorting bars 110 are further provided on the data lines 100 by intersecting thereto. By way of example, the data lines 100 may be divided into two groups in an odd row and an even row, and each shorting bar 100 is used to short-circuit a group of data lines 100 together, arranged to extend at both sides thereof to the first detection region Q2 and the second detection region Q3 on both sides of the electrode lead region Q1, and connected at both ends thereof with the two welding pads, i.e., corresponding one of the first welding pads 120 and the second welding pads 130, respectively. Certainly, a specific grouping of the data lines 100 may not be restricted as above, and the data lines 100 may also be grouped in other ways alternatively without departing from the purpose of the present invention. In a structure for detection of the display panel according to an embodiment of the disclosure, connecting lines which are provided on a single side thereof between all shorting bars 110 and the welding pads 120 for inputting a signal for the shorting bars are cut off, and the shorting bars 110 and the welding pads for inputting the signal for the shorting bars are connected and in communication with a switch 200 respectively. Once a defect test is carried out on the data lines 100, it is only required to connect a block pin with the second welding pads 130, so as to introduce a test signal into the data lines 100.

Correspondingly, a method for detection of a display panel by the structure for detection of the display panel according to embodiments of the disclosure may comprise the following steps:

Step S11, opening the switch 200 on a single side of the display panel between all the shorting bars 110 and the welding pads 120 for inputting the signal for the shorting bars;

Step S12, introducing a detection signal from the welding pads 130 for inputting the signal for the shorting bars; and Step S13, detecting the display panel depending on images displayed by the display panel in a light-on condition thereof.

The structure for detection of the display panel according to embodiments of the disclosure, may provide additional images for detection of the conchoidal fracture by incorporating a switching signal which control signal input for the shorting bars on a single side of the display panel. In other words, in a condition that the switch 200 is cut off, there is just a gray-scale signal (or gray-level signal) of Gray 127 which is inputted by the shorting bars on the single side of the display panel at that time.

Figure 5:
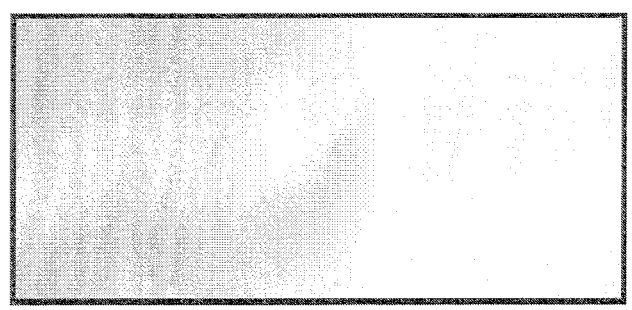
FIG. 5 illustrates a schematic view of detecting displayed images on a unbroken display panel in a light-on condition of the display panel by a method for detection of the display panel, according to an exemplary embodiment of the disclosure.

The detection for the breakage or the conchoidal fracture may exist in the following three aspects:

Once there is no breakage or conchoidal fracture which hurts or damages the shorting bars, since the detection signal is inputted from a single side, there may be some attenuation in the detection signal and thus the detected images for the breakage or the conchoidal fracture present gray-scale images which change gradually from a signal input end provided on a single side to the other side of the display panel, as illustrated in FIG. 5.

Figure 6A:
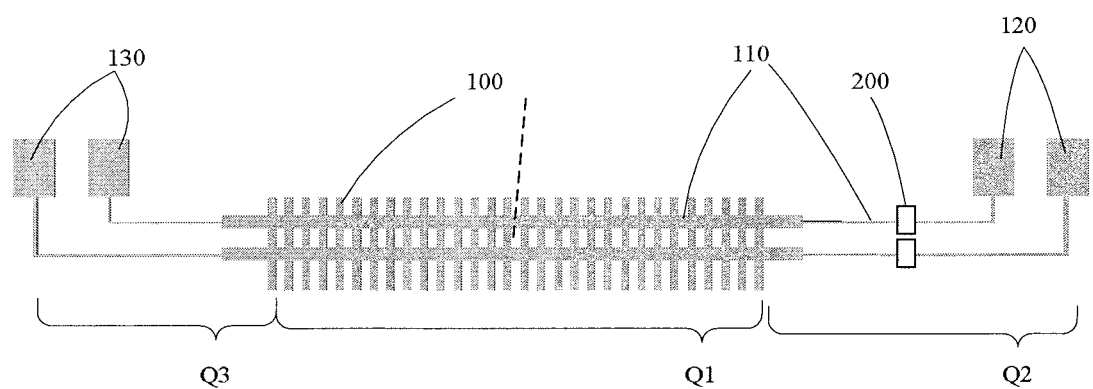
FIG. 6a illustrates a schematic view of detection of a display panel, with a portion of the shorting bars thereof being broken, using a device for detection of a display panel according to an exemplary embodiment of the disclosure.
Figure 6B:
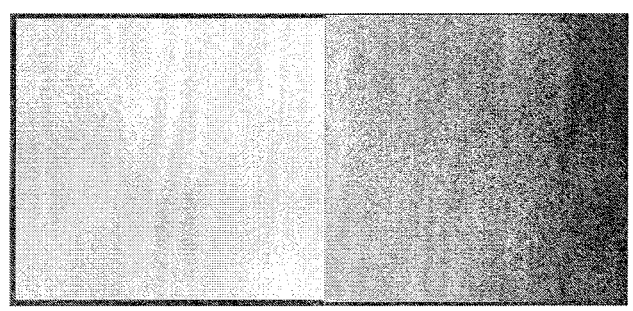
FIG. 6b illustrates a schematic view of detecting corresponding displayed images on a display panel, with a portion of the shorting bars thereof being broken, in a light-on condition of the display panel, by a method for detection of the display panel, according to an exemplary embodiment of the disclosure.

Once there is the breakage or the conchoidal fracture which hurts or damages a single shorting bar which is an outermost one of the shorting bars, or a portion of the shorting bars, as illustrated in FIG. 6a, in case that a broken line is indicative of the position of the breakage or the conchoidal fracture, then, taking a TN product (which is normally white) for example, an image in a light-on condition is split at the position of the breakage or the conchoidal fracture which functions as a dividing line, and the divided image at a side of the display panel where the switch is located may light up, i.e., become brighter, for example, (while such divided image may become darker as to an ADS product which is a normally black product having a wide viewing angle), as illustrated in FIG. 6b.

Figure 7A:
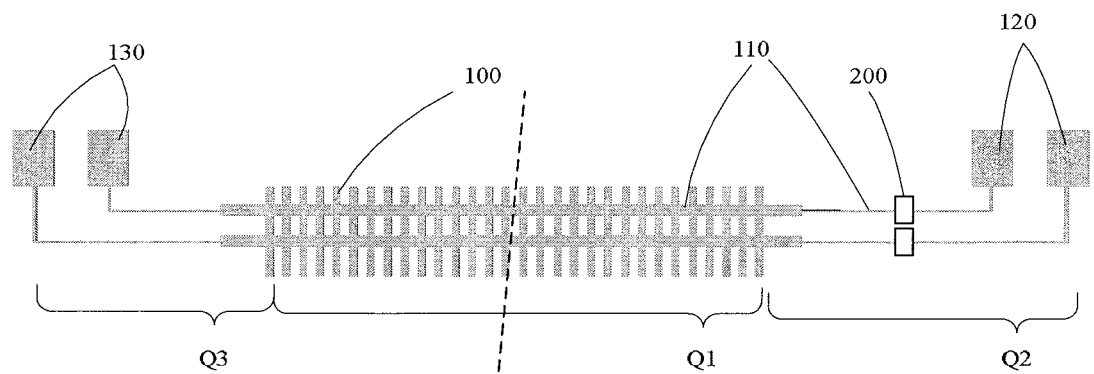
FIG. 7a illustrates a schematic view of detection of a display panel, with all shorting bars thereof being broken, using a device for detection of a display panel according to an exemplary embodiment of the disclosure.
Figure 7B:
FIG. 7b illustrates a schematic view of detecting corresponding displayed images on a display panel, with all shorting bars thereof being broken, in a light-on condition of the display panel, by a method for detection of the display panel, according to an exemplary embodiment of the disclosure.

Once there is the breakage or the conchoidal fracture which hurts or damages all shorting bars, as illustrated in FIG. 7a, in case that a broken line is indicative of the position of the breakage or the conchoidal fracture, then, taking the TN product (which is normally white) for example, an image in a light-on condition is split at the position of the breakage or the conchoidal fracture which functions as a dividing line, and the divided image at a side of the display panel where the switch is located may turn white completely, for example, (while such divided image may turn black as to then ADS product), as illustrated in FIG. 7b.

As above, vertical coordinates of the breakage or the conchoidal fracture may be identical to those of the dividing line for an abnormality of the image, and a depth of the breakage or the conchoidal fracture may be determined by a specific number of the shorting bars which are hurt, i.e., by colors displayed on the image (in the TN product, white color is indicative of a heaviest color; while in the ADS product, black color is indicative of a heaviest color).

According to a embodiment of the disclosure, data lines 100 which are located at the odd-number position(s) connect with one and the same shorting bar 110, and data lines 100 which are located at the even-number position(s) also connect with another one shorting bar 110, so as to avoid any erroneous judgment of defects once the detection signal is introduced due to a time-delay of the signal.

There may be advantageous effects by adopting two shorting bars 110, as follows: a width of each shorting bar 110 may be dimensioned to be relatively large so as to decrease an electrical resistance thereof and thus to solve a problem of signal attenuation caused by loading the detection signal on the welding pads 130 on a single side. A design of two shorting bars 110 may reduce the number of block pins significantly, e.g., from 1000 block pins in conventional condition to 2 block pins in the design according to embodiments of the disclosure, so as to improve stability of a connection between the welding pads 130 and the block pins. And since the shorting bars are provided by intersecting and overlapping the data lines, rather than by penetrating tips of the block pins into the data lines, such that the electrode lead region Q1 is prevented from being punctured and thus hurt/damaged, and from burns due to short circuiting of the block pins.

Certainly, the specific number of the first shorting bars may not be restricted to two, and may be determined by specific operation conditions.

In the embodiment of the disclosure, additional first welding pad(s) 120 and second welding pad(s) 130 are further incorporated to both ends of the shorting bar, and the detection signal provided by the block pins may be connected with the first welding pads 120 or the second welding pads 130 so as to introduce the detection signal into the data lines 100. And it may be known that, a width of the first welding pad 120 is much larger than a width of each of the data lines 100, and a distance between two adjacent first welding pads 120 or two adjacent second welding pads 130 is larger than a width of two data lines. Therefore, such configuration of the first welding pads 120 or the second welding pads 130 and the block pins may sufficiently ensure a stability of a connection therebetween, and may also avoid any short-circuiting problem among block pins; besides, the data lines 100 of the display panel may not be scratched even if the block pins are extremely tiny.

Second Embodiment

In an embodiment of the disclosure, the switch 200 may for example be a field-effect transistor which has advantages such as relatively fast response, relatively low leakage current, relatively large power consumption as compared with an ordinary electrical switch, e.g., a mechanical electrical switch.

In an embodiment of the disclosure, connecting lines which are provided on a single side between all shorting bars 110 and the welding pads 120 for inputting a signal for the shorting bars are cut off and then connected by field-effect transistors respectively, and a drain of each of which is connected with a corresponding shorting bar 110, a source of each of which is connected with a corresponding welding pad 12 for inputting a signal for the shorting bar, while all gates of which are short-circuited together to connect with the welding pad for inputting a switching signal. Both the field-effect transistors and the welding pads for inputting the signal are to be removed by laser in a trimming process once the Cell Test is carried out on the panel, without any effect on subsequent Module processes (MDL processes) such as incorporating backlight, PCB and housing.

In an embodiment of the disclosure, the switching signal which controls the signal input by the shorting bars provided on a single side may be additionally provided. To be specific, once a low level of the switching signal is inputted, i.e., in an OFF condition, at that time, there is just a gray-scale signal of Gray 127 which is inputted by the shorting bars on the single side of the display panel at that time; and once other defects are detected, a high level of the switching signal is inputted, i.e., in an ON condition, then the shorting bars provided at both sides are switched on, and thus a detection is performed in a way similar to existing detections.

The switch may also be a circuit structure which may implement functionalities of switching on and off, e.g., a triode of any type.

Third Embodiment

Figure 8:
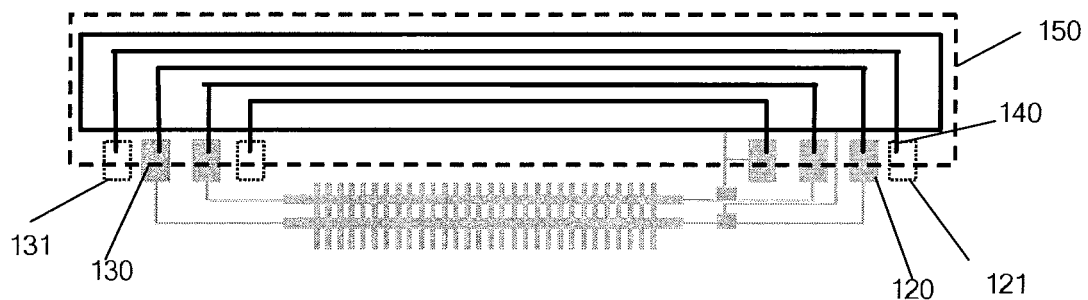
FIG. 8 illustrates a schematic view of a schematic view of another device for detection of a display panel according to an exemplary embodiment of the disclosure.

As compared with the first embodiment as above, the structure for detection of the display panel according to the third embodiment further comprises: a redundant first welding pad 121 which is dimensioned to be similar to and provided at the same side as that of the first welding pad 120, and a redundant second welding pad 131 which is dimensioned to be similar to and provided at a same side as that of the second welding pad 130. The first welding pads 120 and the redundant first welding pad 121 are provided symmetrical with the second welding pads 130 and the redundant second welding pad 131, as illustrated in FIG. 8.

The reason why the redundant first welding pad 121 and the redundant second welding pad 131 are provided lies in that a module 150 of the block pins for detection of data lines 100 of the display panels of different models may be a versatile one in which relative positions of all the first welding pads 120 and the second welding pads 130 are identical for the display panels of different models. Upon detection of signals, the block pins 140 may be suspended in non-signaled positions (i.e., the welding pads which are provided corresponding to these suspended block pins are redundant), and may be connected at positions where the first welding pads 120 and the second welding pads 130 locate; as such, the module of the block pins for detection are versatile for panel products of all models.

The block pins 140 are designed to be symmetrical at both sides, and are connected with one another internally at symmetric positions with an identical output signal. The signals on the electrode lead region of the display panel comprise: a digital signal which requires to be inputted from both sides, a GOA signal which is inputted from a single side and a switching signal in the embodiment. As to the signal which is inputted from both sides, the block pins at symmetric positions are in contact with all the welding pads for inputting a signal on the display panel; and as to the signal which is inputted from a single side, the block pins provided at the same side as the inputted signal are in contact at a single side of the welding pads for inputting a signal on the display panel, while the block pins provided at an opposite side are suspended, and at that time the positions on the display panel corresponding to the suspended block pins may be referred to as Dummy Pad. This design may decrease cost of the Block, and improve convenience and production efficiency.

The structure for detection of the display panel according to embodiments of the disclosure may detect the breakage or the conchoidal fracture in the electrode lead region so as to avoid any omission in detection, may distinguish between the conchoidal fracture and defects in wires so as to avoid any erroneous judgment, and may determine positions of the breakage or the conchoidal fracture timely so as to facilitate troubleshooting among corresponding point locations of the device and further finding out reasons of breakage or crack.

The structure for detection of the display panel according to embodiments of the disclosure may be applicable to the field of detection of flat panel display and cell, such as LCD, PDP, OLED and the like.

It will be understood by those of ordinary skill in the art that all or part of the steps described in above method may be accomplished by a program that instructs relevant hardware and may be stored in a computer readable storage medium, such as read-only memory, magnetic disks, or optical disks. Alternatively, all or part of the steps of the embodiments described above may also be implemented using one or more integrated circuits. Accordingly, the modules/units in the above embodiments may be implemented in a form of hardware, or may be implemented in a form of software function modules. The invention is not limited to any particular form of hardware and software.

In summary, an embodiment of the present invention provides a device and a method for detection of a display panel, which may accurately detect a broken position and a degree of breakage of an electrode lead region of a display panel.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present disclosure exemplarily, and should not be deemed as a restriction thereof.

Although several exemplary embodiments of the general concept of the present disclosure have been shown and described, it would be appreciated by those skilled in the art that various changes or modifications may be made in these embodiments without departing from the principles and spirit of the disclosure and lie within the scope of present application, which scope is defined in the claims and their equivalents.

It should be noted that the word "including" does not exclude other elements or steps, the word "one" or "a" does not exclude multiple elements or steps. In addition, any element label of the claims is not to be construed as limiting the scope of the present disclosure.

What is claimed is:

1. A device for detection of a display panel, which is configured to detect signal lines in an electrode lead region on the display panel,
   wherein the signal lines at least comprises a plurality of data lines which are divided into N groups;
   wherein the device comprises: N shorting bars provided within the electrode lead region of the display panel to intersect the plurality of data lines, each of the N shorting bars short-circuiting one of the N groups of data lines together, a plurality of welding pads provided on both sides of the electrode lead region, each of which shorting bars connects with two welding pad at both ends thereof respectively, and a switch which is provided between each of the N shorting bars and each of the corresponding welding pads connecting with the former on one and the same side of all the shorting bars;
   wherein N is a positive integer not less than 2; and
   wherein each two of the plurality of welding pads at both ends of each of the N shorting bars and the respective switch are located within detection regions outside the electrode lead region, and one of each two of the plurality of welding pads in one of the detection regions at a side of each of the N shorting bars opposite to the respective switch is configured to introduce a detection signal into the data lines.

2. The device according to claim 1, wherein N is equal to 2.

3. The device according to claim 2, wherein data lines which are located at odd-number positions connect with one and the same shorting bar, and data lines which are located at even-number positions also connect with another one shorting bar.

4. The device according to claim 1, wherein a distance between two adjacent welding pads is larger than that between two adjacent data lines.

5. The device according to claim 1, further comprising: redundant welding pads which are dimensioned to be similar to the welding pads,
   wherein the welding pads are provided symmetrically and the redundant welding pads are also provided symmetrically, on both sides of the electrode lead region.

6. The device according to claim 1, wherein the switch is a field-effect transistor.

7. The device according to claim 2, wherein the switch is a field-effect transistor.

8. The device according to claim 3, wherein the switch is a field-effect transistor.

9. The device according to claim 4, wherein the switch is a field-effect transistor.

10. The device according to claim 5, wherein the switch is a field-effect transistor.

11. A method for detection of a display panel, which is applied to the device for detection of the display panel and is configured to detect signal lines in an electrode lead region on the display panel, wherein the signals lines at least comprises a plurality of data lines which are divided into N groups;
    wherein the device comprises: N shorting bars provided within the electrode lead region of the display panel to intersect the plurality of data lines, each of the N shorting bars short-circuiting one of the N groups of data lines together; a plurality of welding pads provided on both sides of the electrode lead region, each of which shorting bars connects with two welding pad at both ends thereof respectively; and a switch which is provided between each of the N shorting bars and each of the corresponding welding pads connecting with the former on one and the same side of all the shorting bars;
    wherein N is a positive integer not less than 2; and
    wherein each two of the plurality of welding pads at both ends of each of the N shorting bars and the respective switch are located within detection regions outside the electrode lead region, and one of each two of the plurality of welding pads in one of the detection regions at a side of each of the N shorting bars opposite to the respective switch is configured to introduce a detection signal into the data lines,
    wherein the method comprises the following steps:
    opening the switch;
    introducing a detection signal from welding pads on a side away from the switch; and
    detecting the display panel depending on images displayed by the display panel in a light-on condition thereof.

12. The method according to claim 11, wherein the step of detecting the display panel depending on images displayed by the display panel in a light-on condition thereof comprising:
    detecting positions where the display panel is broken depending on a dividing line where colors of the images in the light-on condition change.

13. The method according to claim 12, wherein the step of detecting the display panel depending on images displayed by the display panel in a light-on condition thereof comprising:
    detecting a number of the shorting bars which are broken depending on levels of color changes.

* * * * *